June 9, 1953 A. D. EPLETT ET AL 2,641,278
PRESSURE RELIEF VALVE
Filed Aug. 19, 1946
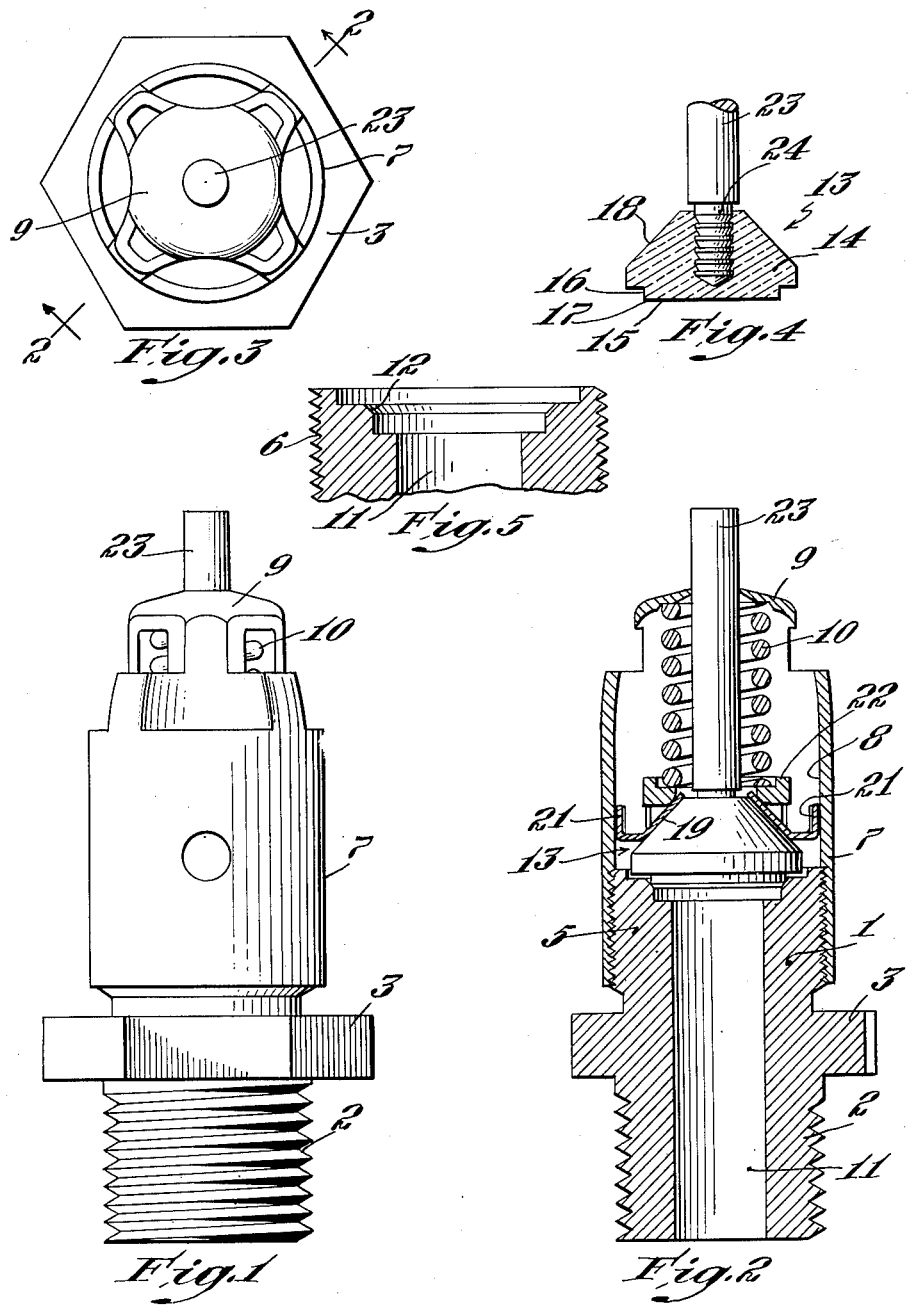
Inventors
Albert D. Eplett
Frank H. Hopkins
by Roberts Cushman & Grover
attys.

Patented June 9, 1953

2,641,278

UNITED STATES PATENT OFFICE 2,641,278

PRESSURE RELIEF VALVE

Albert D. Eplett, Stratford, and Frank H. Hopkins, Fairfield, Conn., assignors to Manning, Maxwell & Moore, Incorporated, New York, N. Y., a corporation of New Jersey Application August 19, 1946, Serial No. 691,566

1 Claim. (Cl. 137—542)

This invention relates to spring-loaded relief valves such as are commonly used in connection with pneumatic apparatus, for instance air pressure tanks, compressors, pressure lines and the like, wherein air or other gas is held under or subjected to pressure. These relief or safety valves are used to protect the pressure equipment in case of failure of controls, excessive rise of temperature, or other circumstances which may cause the working pressure of the medium to exceed the safe pressure for which the apparatus was designed. Such spring-loaded relief or safety valves are set to pop or open when the fluid pressure beneath the valve head rises to a definite predetermined pressure known as the popping pressure which is usually governed by codes of safety rules, the popping pressure bearing a definite relationship to the normal or working pressure of the medium. When herein reference is made to "excessive pressure" it is thereby intended to denote a pressure above the normal working pressure such as causes the valve head to rise from its seat. This difference between the popping pressure of the relief valve and the working pressure is made as small as possible since the apparatus must be designed to withstand pressures between the working pressure and the popping pressure and thus an excessive differential between these pressures necessitates abnormally heavy and expensive apparatus. It is usual practice to have the gap between the popping and working pressures within a range from 10 to 20% of the normal or working pressure. The available load which actually holds the valve against its seat is the difference between the working pressure and the popping pressure. Thus, for instance, in a valve having a valve seat of ½ inch diameter and which is set to pop at a pressure of 200 pounds with a 10% differential between popping and working pressures, the actual available load for holding the valve to its seat is approximately 3.92 pounds. Safety valves of this kind remain closed at all times except when they open in response to undesired rise in pressure of the fluid medium and this ordinary, regular and customary closed condition of the valve is herein referred to as its "normal condition," and the "normal working load" is the load imposed by the spring which, under ordinary conditions, keeps the valve closed.

The material most commonly used heretofore for making valves of this type has been bronze, although stainless steel has been used to some extent. The prevention of leakage between two metal surfaces, that is to say between the valve seat and the valve head or "feather" depends upon the perfection of contact of these surfaces. From a practical standpoint, it is impossible to make two metal seating surfaces with so perfect a finish that they will completely prevent leakage of gas under pressure. Even with great care in manufacture the slight, even microscopic imperfections in the metal of the seating surfaces, due, for instance, to marks left by finishing tools, lack of homogeneity in the metal, inexactness in axial alignment of the surfaces, relaxation in internal stresses or even scratches left by polishing materials, are sufficient to permit leakage of high pressure gas between the surfaces. Obviously the available loading pressure at the small pressure differentials employed is insufficient elastically to deform the metal surfaces sufficiently to close or eliminate the effects of these very minor irregularities. As above pointed out, it is not permissible from the practical commercial standpoint to increase the loading, sufficiently to deform the metal surfaces, by increasing the differential between the popping and working pressures. While it has been attempted to improve the tightness of valves by laboriously hand-finishing the opposing surfaces of the seat and head, the expense involved is prohibitive, at least as respects valves of the usual commercial types, and, as already pointed out, even the finest surface finish does not altogether prevent leakage. Furthermore, even though the surfaces be finished to the highest degree possible, the accidental entry of tiny particles of dust or other material carried by the gas or air will hold the seat surfaces apart or damage them so that leakage will take place in spite of the initial fine finish.

The existence of leakage in relief valves of this type often remains unobserved by the users due to the fact that the equipment is ordinarily designed by the manufacturer to compensate for this leakage. Leakage in such metal-to-metal valves has been accepted as a necessary evil and sufficient margin in the pressure supply equipment is ordinarily specified to take care of this leakage. The general recognition of this situation has resulted in the use of very loosely defined specifications as to acceptability of air valves by the industry. Thus, a valve may be defined as "tight" if it does not permit an excessive amount of pressure drop during a stand-by period or if it does not necessitate an excessive amount of compressor operation during the acceptance test. However, when such relief valves are actually checked, they are invariably found to leak and doubtless all valves of the same general character leak in the same way, although never subjected to actual test for tightness. Due to severity of service conditions, such as those encountered in submarine practice or in connection with air storage bottles used for starting diesel engines, it has become customary to subject such valves to more exacting tests, and these tests have confirmed the above suggestion that there is no such thing as a "tight" air relief valve. Thus, it has now become customary to specify a permissive leakage in such a valve, rather than to specify that the valve must be "tight." Furthermore, it is necessary that the specification of permissive leakage indicate the differential between the working pressure and the popping pressure.

It has heretofore been proposed to improve the tightness of such valves by substituting other materials for the metal commonly employed in the valve seat. Thus, it has been suggested that a relatively soft material, for instance rubber, might be employed, in the expectation that this material would deform so as to provide a perfect seal when the valve head is seated. However, since the valve is spring-loaded and the spring exerts a constant pressure, the result is that the soft material gradually flows, thus relaxing the spring load so that the valve may pop prematurely. Furthermore, the plastic flow of the soft material often results in its sticking to the opposed surface to a degree that may be almost molecular, thus strongly opposing the separation of the head and seat and thus dangerously raising the actual popping point of the valve.

It has also been proposed to provide a valve head with a thin seat-contacting disk or washer of a synthetic plastic material, but it has been found that the force applied in securing such a thin disk to the head warps or distorts it so that it does not make a perfect contact with the seat.

The principal object of the present invention is to provide a valve in which the above difficulties are substantially overcome, and in particular to provide a valve of the above class which may be adjusted to have a low differential between the working and popping pressures but which does not substantially leak when closed. A further object is to provide a spring-loaded relief valve of the kind customarily employed in pneumatic apparatus or the like which will be substantially leak-tight under working conditions, with a differential not substantially exceeding from 10 to 20% of the popping pressure. A further object is to provide a relief valve of the kind referred to wherein the valve seat may be of conventional material, to wit, metal, while the valve head is of a non-metal which is immune to plastic flow, that is to say it does not permanently deform at its surface of contact with the seat in response to the loading pressure no matter how long the valve may remain closed but which does yield, within the elastic limits of the material of which it is made, sufficiently to insure a leak-tight contact between the head and seat. A further object is to provide a relief valve of the kind referred to wherein the valve head is a unitary mass of non-metallic material which is normally hard but elastic; non-corrosive; not deleteriously affected by moisture, gases or ordinary air, and which may be produced at reasonable cost. A further object is to provide a relief valve having a head of moulded plastic material having a high coefficient of thermal expansion, the valve including head-guiding means whose function is substantially unaffected by temperature variations. A further object is to provide a pressure relief valve of the kind referred to having a metallic seat and a head of organic material, the parts being so designed that the head elastically deforms sufficiently to insure a leak-tight contact with the seat but has no tendency to stick to the seat even after long periods of closure. A further object is to provide a relief valve for use in controlling the escape of air or other gases under pressure and which provides a far more perfect seal between the contacting surfaces of the seat and head than has been obtainable in metal-to-metal valves of this type. Other and further objects and advantages of the invention will be pointed out in the following more detailed description and by reference to the accompanying drawings wherein Fig. 1 is a side elevation of a relief valve embodying the present invention;

Fig. 2 is a diametrical section on the line 2—2 of Fig. 3;

Fig. 3 is a plan view of the valve of Fig. 1;

Fig. 4 is a fragmentary view showing the valve head in diametrical cross-section; and Fig. 5 is a fragmentary diametrical section to larger scale, showing the upper part of the valve casing and the valve seat.

Referring to the drawings, the numeral 1 designates the valve casing which may be made of any desired material and in any suitable manner. For example, it may be of metal and formed by forging, die casting, machining from a solid bar, or by any other suitable procedure. This valve casing comprises the externally screw-threaded nipple portion 2 for connection to a pipe or other vessel containing the pressure fluid, and, as here illustrated, is provided with a hexagonal flange 3 for the convenient application of a wrench. The upper part 5 of the casing is externally screw-threaded at 6 for engagement with a valve bonnet 7 which may be of any suitable material and made in any appropriate way, and which, in accordance with the present invention, is provided with an internal surface 8 which, for a substantial distance above the upper end of the casing proper, is vertically rectilinear and preferably cylindrical. The bonnet is provided with a top 9 which forms the upper abutment for the coiled loading spring 10.

The valve body is provided with an axial bore or throat passage 11, and at its upper end the valve body is provided with the annular beveled seat 12, coaxial with the throat passage 11, and which, as here illustrated, is beveled at a 45° angle. However, the exact angle of bevel is not a necessary feature of the invention.

The valve head 13, which cooperates with the seat 12, is a unitary mass 14 of a hard, non-metallic organic material, such, for example, as a moulded synthetic resin. While other resinous materials may be employed, providing they have the proper physical characteristics, it has been found that nylon is well suited for this purpose. The valve head may be made in accordance with usual procedures in the formation of small articles from plastics, for instance by injection moulding, although it may be desirable, subsequent to the moulding operation, to subject the moulded mass to a finishing operation to insure accuracy of the operative surfaces. As illustrated in Fig. 4, the head 13 has a substantially flat bottom face 15 and a peripheral annular surface 16 which intersects the plane of the face 15 at an angle of substanitally 90°, thus defining the right angular peripheral seat-engaging edge 17. This edge constitutes the contact surface of the head, and when the valve is closed the edge 17 engages the beveled seat surface 12.

Due to the large coefficient of expansion of plastic materials, including nylon, it is desirable to leave the head unconfined, peripherally. For the same reason, it is impossible to provide the head with the usual integral wing guides sliding in the throat passage 11, such as are customarily employed for keeping a valve head properly and accurately centered. Such wing guides, if made of plastic material, would bind in the passage 11 in response to temperature increase and would cause the valve to stick. In accordance with the present invention, the upper part of the valve head 13 is tapered upwardly, as shown at 18, to form a truncated cone, and a sheet metal spider, having a conical upwardly tapering central portion 19, is arranged to rest upon the conical surface 18 of the valve head. This spider comprises a plurality of spaced arms 21, four such arms here being shown, which are arranged symmetrically about the spider and which have surfaces which slide in contact with the inner cylindrical surface 8 of the valve bonnet. The spider is preferably made of sheet material and is somewhat resilient, and temperature variations in the dimensions of the head are not transmitted to the arms 21 to an extent such as appreciably to affect the ease of sliding of the spider within the bonnet. A ring 22 rests upon the upper surface of the central part 19 of the spider and constitutes the lower abutment for the spring 10. The spring 10 presses the ring 22 downwardly against the spider and clamps the spider against the upper surface 18 of the valve head so that the spider moves with the head. By turning the bonnet relatively to the valve casing, the tension of the spring may be varied. The top of the bonnet has a central guide aperture and the valve head has a rigid stem 23, preferably of metal, which has a snug sliding fit in the opening in the top of the bonnet. The lower end of the stem is preferably provided with anchoring projections, as shown at 24, and is embedded and firmly anchored in the substance of the valve head.

Since the contact surface of the head, that is to say the edge 17, is defined by the intersection of the surfaces 15 and 16, the operative contact between the head and the beveled seat is substantially a line contact, and thus the available loading pressure is concentrated on the material of the head at this very thin line. Plastic material, such as that above referred to, is sensibly hard, although elastic, and thus under the loading pressure the material of the head is slightly deformed where it contacts the seat, thus compensating for slight imperfections in the seat surface and insuring a substantially leaktight seal. In this respect the plastic material differs from metal, which at the loading pressure would not deform sufficiently to conform to imperfections in the seat surface. However, the material of the head is not of a type which will flow plastically under the working load and does not take a permanent set when deformed under the loading pressure, the deformation being within the elastic limit of the material. Thus, immediately the valve head is separated from the seat, the valve head resumes its initial shape. The very narrow contact surface minimizes the possibility of trapping hard particles between the seating surfaces, thus eliminating one of the common causes of leakage in valves of previous types, and the material referred to, having no plastic flow under the loading conditions, is entirely free of any tendency to unite molecularly or stick to the valve seat. As above noted, it has heretofore been proposed to provide valve heads with seat-contacting surfaces of rubber or synthetic rubber, for instance Thiokol, but such materials tend to stick to the valve seat, and for safety valve use, the employment of such materials is not permissible. On the other hand, carefully conducted tests show that nylon has no tendency to stick or cling to the valve seat, even when left loaded and seated for long periods of time. The material herein used is also very resistant to abrasion and is very tough and durable; it is not injuriously affected by moisture nor by air or other gases, nor by ordinary lubricating oils and it will withstand a temperature as high as 300° F. without permanent deformation or losing its elasticity.

While one desirable embodiment of the invention has been here illustrated by way of example, it is to be understood that the invention is broadly inclusive of any and all modifications falling within the scope of the appended claims.

I claim:

A safety valve of the kind in which a valve head normally contacts an annular metallic seat having a head-contacting surface whose diameter increases in the direction of fluid flow, the head consisting of a unitary solid mass of synthetic resin which is urged into contact with the seat by a loading spring and is lifted from the seat only by fluid pressure and wherein the valve comprises a bonnet which houses the loading spring, the bonnet having a guide opening at its top which is coaxial with the valve seat, and a rigid stem having a sliding fit in said opening in the bonnet and whose lower end is fixedly embedded in the substance of the valve head, a spring embracing the stem and which normally holds the valve head in leaktight contact with the seat, characterized in that the valve head comprises an upwardly tapering truncated conical body portion and has a peripheral surface and a bottom surface which intersect thereby providing an annular seat-contacting edge, the body portion of the valve head being peripherally unconfined when the valve is closed, the valve head being of a nylon, the body portion of the head being shaped retaining up to a temperature of 300° F. and under the load imposed by the spring, the valve head having a high coefficient of thermal expansion as compared with that of metal, further characterized in having a metallic guide provided with an apertured central portion which rests upon the upwardly tapering surface of the valve head and which is interposed between the lower end of the spring and the valve head and which is clamped against the valve head by the force exerted by the spring, said guide having a low coefficient of expansion as compared to that of nylon and having a sliding fit with an interior surface of the bonnet, thereby to maintain the valve head in coaxial relation to the seat.

ALBERT D. EPLETT.
FRANK H. HOPKINS.

References Cited in the file of this patent

UNITED STATES PATENTS

| Number | Name | Date |
| --- | --- | --- |
| 1,152,733 | Houser | Sept. 7, 1915 |
| 1,715,353 | Cordley | June 4, 1929 |
| 1,775,091 | Frank | Sept. 9, 1930 |
| 1,800,185 | Thrush | Apr. 7, 1931 |
| 2,003,840 | Sorenson | June 4, 1935 |
| 2,252,554 | Carothers | Aug. 12, 1941 |
| 2,268,119 | Honstetter | Dec. 30, 1941 |
| 2,346,938 | Oravec | Apr. 18, 1944 |
| 2,370,245 | Jacobsson | Feb. 27, 1945 |
| 2,520,092 | Fredrickson et al. | Aug. 22, 1950 |

OTHER REFERENCES

"Handbook of Plastics" by Simonds and Ellis, 1943, Fourth Printing, pages 371, 373, 382–384 and 882, D. Van Nostrand Co., Inc., 250 Fourth Ave., N. Y., N. Y.